Sept. 8, 1942.    R. J. KAULA    2,295,220
PRESS FOR MOLDING PLASTIC MATERIALS
Filed Jan. 9, 1940
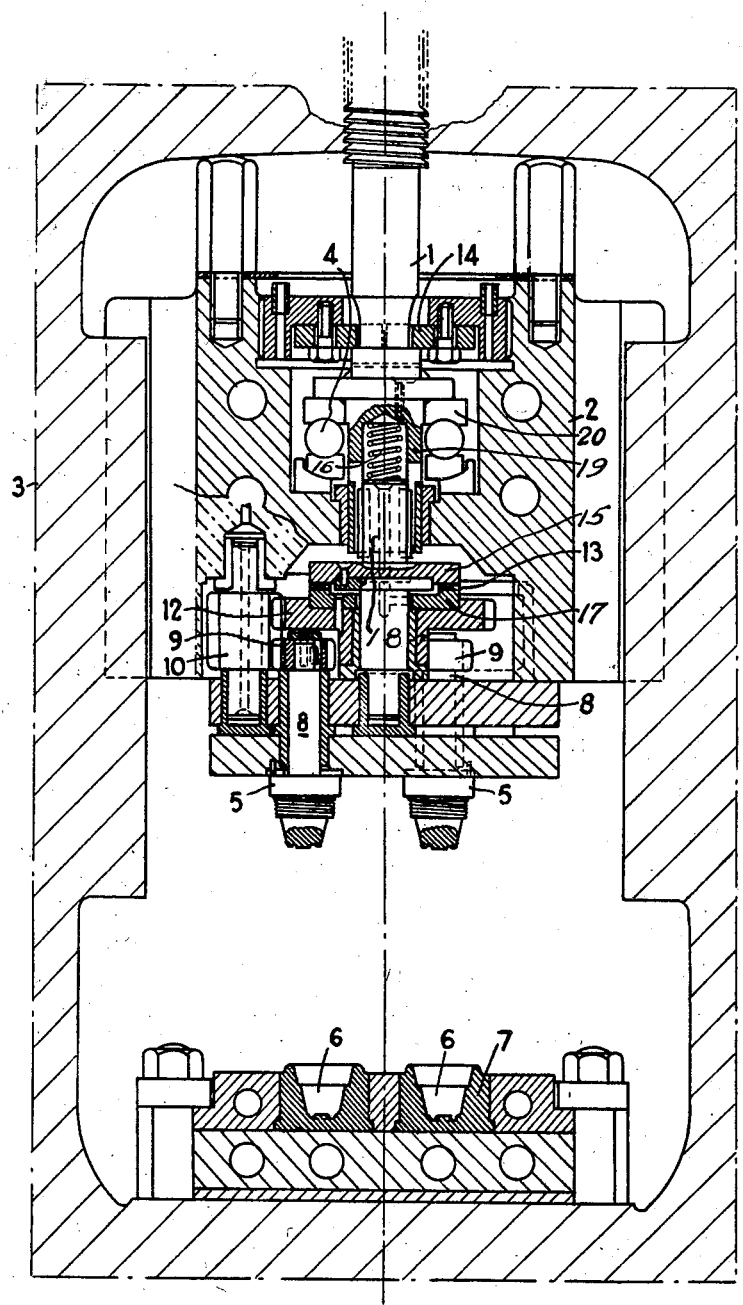
INVENTOR
RUDOLPH JOHN KAULA
BY
ATTORNEY Patented Sept. 8, 1942

2,295,220

UNITED STATES PATENT OFFICE 2,295,220

PRESS FOR MOLDING PLASTIC MATERIAL

Rudolph John Kaula, Edgbaston, Birmingham, England, assignor to The General Electric Company Limited, London, England Application January 9, 1940, Serial No. 313,053
In Great Britain September 7, 1938

10 Claims. (Cl. 18—16)

This invention relates to presses for molding plastic material, for example, composition comprising synthetic resin and a suitable filler under heat and pressure and for producing screw-threaded moldings such, for example, as lamp-holder caps. The invention also relates to presses of the kind including a mold portion arranged to be separated from a complementary mold portion by the relative rotation between a screw-threaded part of the press attached to the first mold portion and another part of the press.

According to the present invention, in a press for producing from plastic material screw-threaded moldings such, for example, as lamp-holder caps and of the kind specified, for the purpose of disengaging during opening of the press the formed screw-thread of a molding from the screw-threaded part of a mold portion which produces the screw-thread, relative rotation between the molding and the said mold portion including the screw-threaded part is arranged to be effected by the means which separates the two mold portions.

Preferably, the mold portion including the screw-threaded part is arranged to be rotated relatively to the molding through suitable gearing from the said means.

One construction of a press in accordance with the present invention and designed for the production of screw-threaded lampholder caps will now be described by way of example with reference to the single figure of the accompanying drawing which shows a side elevation of the press partly in cross-section. The press is arranged to produce four caps at each operation and is generally similar in design to the press shown in U. S. Patent specification No. 2,029,026, being arranged to be electrically operated in a similar manner.

Referring now to the drawing, the press comprises a screwed operating spindle 1 which is adapted during the downward stroke to transmit its pressure to a movable mold head 2 sliding vertically in the press frame 3 through a ball bearing thrust race 4. This thrust race 4 permits rotation of the screwed operating spindle 1 relatively to the mold head 2. The mold head 2 carries four mold portions, referred to hereinafter, of which only two 5 are shown and which are each arranged to form a screw thread on the inside of a lampholder cap and these mold portions 5 are complementary to four cavity or bottom mold portions of which only two 6 are shown and which are formed in a stationary base plate 7.

Each mold portion 5 carried by the mold head 2 is mounted on a spindle 8 rotatable about an axis parallel to the screwed operating spindle 1 and coaxial with the thread-forming part of the mold portion 5 and at the end of the spindle 8 remote from the mold portion 5 there is secured a gear wheel 9 which engages a further idler gear wheel 10 mounted on a spindle 11 also carried by the mold head 2. There are, of course, four of these further or spur gear wheels and, besides meshing with the gear wheels 9 of the mold portions 5, they mesh with a single gear wheel 12 arranged to be driven by the screwed operating spindle 1 through a spring loaded one-direction face clutch 13. The clutch 13 is of a known kind comprising a first and upper member 15 coupled with the upper part 20 of the thrust race 4 and biased by a spring 16, and a second and lower member 17 rigidly connected with the gear wheel 12. The member 15 is rigidly connected to a member 18 which is slidable up and down to a limited extent in the lower end of an extension 19 of the part 20 of the thrust race 4. The clutch 13 is so arranged that a drive is only transmitted therethrough during upward travel of the mold head 2 and the gearing is so arranged that it compensates for the relative screw pitch of the press and that of the moldings, and the screw action on the press opening automatically unscrews the mold portion 5 from a finished molding. The latter is thus left in a position to be ejected later from the cavity or bottom mold portion 6.

In operation of the press, assuming the mold head 2 is raised, during the downward stroke of the head 2, the clutch 13 rides freely so that the threaded mold portions 5 are actuated by the downward pressure of the press but do not revolve. On completion of the molding period, the screwed operating spindle 1 is reversed in the ordinary way and raises the mold portions 5 by means of a lifting plate 14. At the same time, the rotation of the spindle 1 to raise the mold head 2 is transmitted through the face clutch 13, which is now active, to the train of gears and causes the threaded mold portions 5 to revolve at a rate corresponding to the lift on the press spindle 1. In other words, if the screw pitch on the press spindle 1 is six threads per inch and the mold portions are designed to produce a threaded lampholder cap having a screw thread of twenty-four threads per inch, a gear ratio of 4 to 1 is introduced with the result that the helical movement produced by the mold portions 5 corresponds to that of the thread in the molding so that no undue strain is placed on the molded threads on the opening stroke. To ensure that the moldings do not revolve in the cavity or bottom mold portions 6 some form of ribbing or ovality on the outer circumference of the cap is conveniently introduced in known manner.

Naturally, the number of moldings produced by one operation of the press may be varied and will depend upon the available power thereof.

I claim:

1. In a press for producing from plastic material screw-threaded moldings such as lampholder caps, the combination of a first and stationary mold portion, a second and rotatable mold portion complementary to said first mold portion, one of said mold portions having a screw-thread thereon, a longitudinally slidable carrier upon which said second mold portion is mounted, a rotatable screw-threaded operating spindle rotatably coupled with said carrier, a stationary screw-threaded part associated with said spindle, and suitable gearing coupling said spindle with said second and rotatable mold portion.

2. In a press for producing from plastic material a plurality of screw-threaded moldings at one operation of said press, the combination of a plurality of first and stationary mold portions, an equal number of second and rotatable mold portions complementary to said first mold portions, one of the sets of mold portions having screw threads thereon, a longitudinally slidable carrier upon which said second mold portions are mounted, a rotatable screw-threaded operating spindle rotatably coupled with said carrier, a stationary screw-threaded part associated with said spindle, and suitable gearing coupling said spindle and said second and rotatable mold portions.

3. In a press for producing from plastic material screw-threaded moldings such as lampholder caps, the combination of a first and stationary mold portion, a second and rotatable mold portion complementary to said first mold portion, one of said mold portions having a screw-thread thereon, a longitudinally slidable carrier upon which said second mold portion is mounted, a rotatable screw-threaded operating spindle rotatably coupled with said carrier, a stationary screw-threaded part associated with said spindle, and a spring-loaded, one direction face clutch having one member coupled to said spindle and the other member coupled through suitable gearing to said second and rotatable mold portion.

4. In a press for producing from plastic material a plurality of screw-threaded moldings at one operation of said press, the combination of a plurality of first and stationary mold portions, an equal number of second and rotatable mold portions complementary to said first mold portions, one of the sets of mold portions having screw threads thereon, a longitudinally slidable carrier upon which said second mold portions are mounted, a rotatable screw-threaded operating spindle rotatably coupled with said carrier, a stationary screw-threaded part associated with said spindle, and a spring-loaded, one direction face clutch having one member coupled to said spindle and the other member coupled through suitable gearing to said second and rotatable mold portions.

5. In a press as claimed in claim 2, a single base plate carrying said first and stationary mold portions.

6. In a press of the character described, the combination of a stationary mold member, a rotatable mold member complementary to said stationary mold member, one of said mold members having a screw-thread portion for impressing a screw thread upon an article molded in said press, a mold head on which said rotatable member is non-translatably carried, means to reciprocably translate said mold head, means to prevent rotation of said mold head, means to turn said rotatable mold member, and means to positively synchronize said mold member turning means with said mold head translating means so that for each revolution of said rotatable member said mold head will be translated a distance equal to the pitch of said screw thread.

7. In a press of the character described, the combination of a stationary mold member, a rotatable mold member complementary to said stationary mold member, one of said mold members having a screw-thread portion for impressing a screw thread upon an article molded in said press, a mold head on which said rotatable member is non-translatably carried, means to reciprocably translate said mold head, means to prevent rotation of said mold head, means to turn said rotatable mold member, means to positively synchronize said mold member turning means with said mold head translating means so that for each revolution of said rotatable member said mold head will be translated a distance equal to the pitch of said screw thread, and means to render said last named means inoperable when said rotatable mold member is approaching said stationary mold member.

8. In a press of the character described, the combination of a stationary mold member, a rotatable mold member complementary to said stationary mold member, one of said mold members having a screw-thread portion for impressing a screw thread upon an article molded in said press, a mold head on which said rotatable member is non-translatably carried, a screw drive for reciprocably translating said mold head, means to prevent rotation of said mold head, means to turn said rotatable mold member, and means to positively synchronize said mold member turning means with said screw drive so that for each revolution of said rotatable member said mold head will be translated a distance equal to the pitch of said screw thread.

9. In a press of the character described, the combination of a mold head, a screw-threaded spindle drive coupled with said head for reciprocably translating said mold head, means to prevent rotation of said mold head, a rotatable mold member carried by said head, the axis of rotation of said rotatable member being non-coincident with the axis of rotation of said spindle, a stationary mold member, one of said mold members having a screw-thread portion for impressing a screw thread upon an article molded in said press, means to turn said rotatable mold member, and means to synchronize said mold member turning means with said spindle drive.

10. In a press of the character described, the combination of a mold head, a screw-threaded spindle drive coupled with said head for reciprocably translating said mold head, means to prevent rotation of said mold head, a rotatable mold member carried by said head, the axis of rotation of said rotatable member being non-coincident with the axis of rotation of said spindle, a stationary mold member, one of said mold members having a screw-thread portion for impressing a screw thread upon an article molded in said press, means to turn said rotatable mold member, and means to synchronize said mold member turning means with said spindle drive, said last named means including a step-up gear train.

RUDOLPH JOHN KAULA.